(12) United States Patent
Lin (10) Patent No.: US 9,781,795 B1
(45) Date of Patent: Oct. 3, 2017

(54) LIGHT FIXTURE PROVIDING MULTIPLE SWITCHABLE BRIGHTNESS LEVELS

(71) Applicant: Pin-Chih Lin, Taipei (TW)

(72) Inventor: Pin-Chih Lin, Taipei (TW)

( * ) Notice: Subject to any disclaimer, the term of this patent is extended or adjusted under 35 U.S.C. 154(b) by 0 days.

(21) Appl. No.: 15/384,670

(22) Filed: Dec. 20, 2016

Related U.S. Application Data

(60) Provisional application No. 62/342,269, filed on May 27, 2016.

(30) Foreign Application Priority Data

Aug. 16, 2016 (TW) .............................. 105126064 A (51) Int. Cl.
*H05B 33/08* (2006.01)
*H05B 37/02* (2006.01)

(52) U.S. Cl.
CPC ..... *H05B 33/0845* (2013.01); *H05B 33/0815* (2013.01); *H05B 33/0827* (2013.01); *H05B 37/029* (2013.01); *H05B 37/0281* (2013.01)

(58) Field of Classification Search
CPC combination set(s) only.
See application file for complete search history.

*Primary Examiner* — Douglas W Owens
*Assistant Examiner* — Jianzi Chen
(74) *Attorney, Agent, or Firm* — Husch Blackwell LLP (57) ABSTRACT

A light fixture receives AC power via a light switch to drive light emission of a light emitting module, and is switchable among multiple states that include a brightness selecting state and a selected brightness state. The light fixture causes the light emitting module to cyclically emit light according to multiple brightness levels in sequence in the brightness selecting state, and to emit light according to one of the multiple brightness levels in the selected brightness state.

20 Claims, 5 Drawing Sheets

LIGHT FIXTURE PROVIDING MULTIPLE SWITCHABLE BRIGHTNESS LEVELS

CROSS-REFERENCE TO RELATED APPLICATION

This application claims priorities of U.S. Provisional Patent Application No. 62/342,269, filed on May 27, 2016, and Taiwanese Patent Application No. 105126064, filed on Aug. 16, 2016.

FIELD

The disclosure relates to a light fixture, and more particularly to a light fixture providing multiple switchable brightness levels.

BACKGROUND

Traditionally, if it is desired to cause an existing lighting equipment of a building, such as a fluorescent lamp light fixture, a downlight fixture, etc., to have a brightness-adjustable function, an additional dimmer which may use a triac to adjust brightness of the light may need to be installed in a neighborhood of a light switch of the lighting equipment, or be integrated with the light switch. However, installation of the dimmer may result in damage of a building wall or cause a problem of wiring.

In recent years, remote light fixtures may use technologies of, for example, infrared, radio frequency, Wi-Fi, Bluetooth, Zigbee, power line communication (PLC), etc., to remotely adjust brightness of light emitting diode devices. However, in such applications, signal receivers may need to be built in a driver device or inside the fixture, and a remote controller or a portable device such as a mobile phone is necessary for user operation, causing inconvenience.

SUMMARY

Therefore, an object of the disclosure is to provide a light fixture that can alleviate at least one of the drawbacks of the prior art.

According to the disclosure, the light fixture is coupled to an alternating current (AC) power source via a light switch. The light switch permits provision of AC power by the AC power source to the light fixture when conducting, and stops provision of the AC power to the light fixture when not conducting. The light fixture includes a storage unit and a driving unit.

The storage unit is configured to store therein a lighting state of the light fixture. The lighting state is one of a plurality of reference states that include a brightness selecting state and a selected brightness state. The driving unit is to be coupled to the light switch for receiving the AC power when the light switch conducts, is to be coupled to a light emitting module, and determines, immediately after receipt of the AC power, which one of the reference states the lighting state is. The driving unit drives the light emitting module to cyclically emit light according to a plurality of brightness levels that are arranged in a predetermined sequence when the driving unit receives the AC power and determines that the lighting state is the brightness selecting state. The driving unit drives the light emitting module to stably emit light according to one of the brightness levels when the driving unit receives the AC power and determines that the lighting state is the selected brightness state.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
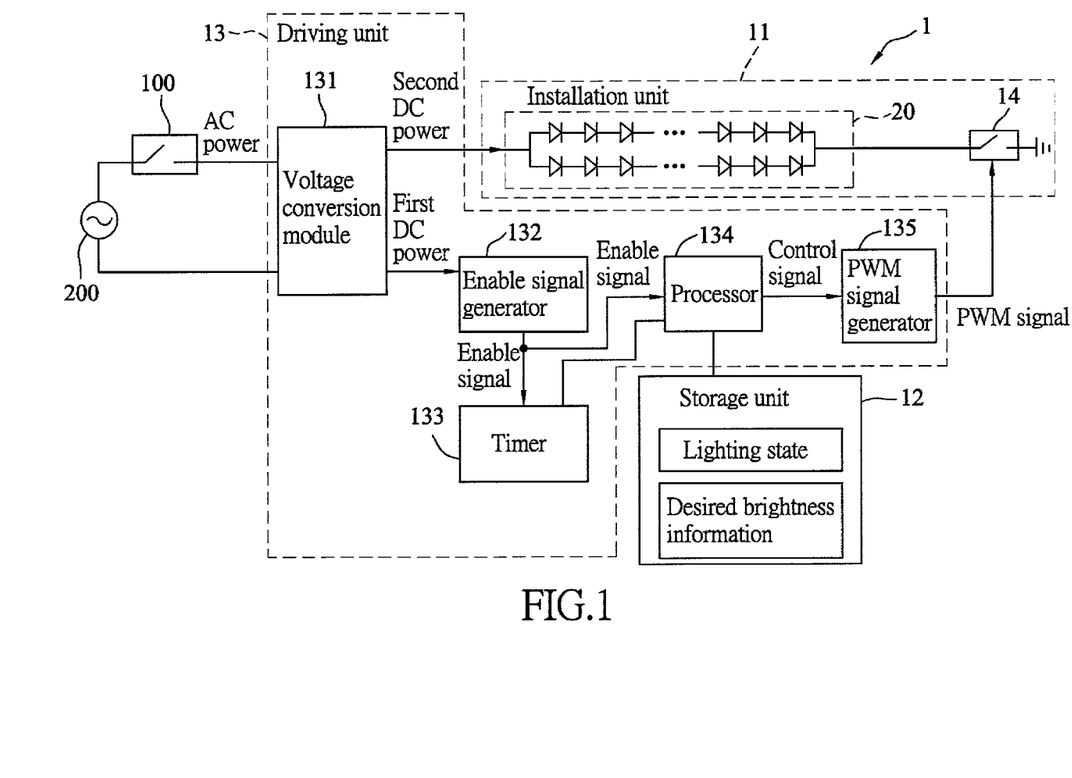
FIG. 1 is a circuit block diagram illustrating a first embodiment of the light fixture according to the disclosure.

Referring to FIG. 1, the first embodiment of the light fixture 1 according to this disclosure is shown to be coupled to an alternating current (AC) power source 200 via a light switch 100, and to a light emitting module 20. The light switch 100 permits provision of AC power by the AC power source 200 to the light fixture 1 when conducting, and stops provision of the AC power to the light fixture 1 when not conducting. The light fixture 1 includes an installation unit 11 for installing the light emitting module 20 therein, a storage unit 12, a driving unit 13 and a dimming switch 14.

In this embodiment, the light emitting module 20 is coupled to the dimming switch 14 in series between the driving unit 13 and ground, and is integrated within the light fixture 1. The light emitting module 20 may include two parallel-connected LED strings each having multiple LEDs coupled in series, and the dimming switch 14 may be a relay coupled between the light emitting module 20 and ground, but this disclosure is not limited to such. The dimming switch 14 has a control terminal, and is configured to conduct or not conduct according to a signal provided to the control terminal thereof.

In this embodiment, the storage unit 12 may include a flash memory, but this disclosure is not limited thereto. The storage unit 12 stores therein a lighting state of the light fixture 1 in a form of a code, and a desired brightness information. The lighting state may be one of multiple reference states which include multiple predetermined brightness states corresponding to different predetermined brightness levels, a brightness selecting state and a selected brightness state; the reference states are arranged in a sequence in the order of the predetermined brightness levels, the brightness selecting state and the selected brightness state, and correspond to a series of consecutive reference codes (e.g., codes "000", "001", "010" . . . ), but this disclosure is not limited to such.

The driving unit 13 includes a voltage conversion module 131, an enable signal generator 132, a timer 133, a processor 134 and a pulse width modulation (PWM) signal generator 135.

The voltage conversion module 131 is coupled to the light switch 100 for receiving the AC power when the light switch 100 conducts, converts the AC power into a first direct current (DC) power and a second DC power using a conventional method, and is coupled to the light emitting module 20 for providing the second DC power thereto. In this embodiment, the first DC power and the second DC power have different constant voltages, but this disclosure is not limited thereto. The light emitting module 20 emits light according to the second DC power when the dimming switch 14 conducts, and does not emit light when the dimming switch 14 does not conduct.

The enable signal generator 132 is coupled to the voltage conversion module 131 for receiving the first DC power, and generates an enable signal upon receipt of the first AC power. The enable signal generator 132 may be a power-on reset generator that generates a reset signal to serve as the enable signal when the first AC power serving as a power source is applied thereto, but this disclosure is not limited thereto.

The timer 133 is coupled to the enable signal generator 132 for receiving the enable signal, is coupled to the processor 134, and is configured to start timing a switch-on time period that corresponds to a time period during which the driving unit 13 continuously receives the AC power immediately after receipt of the enable signal.

The processor 134 is coupled to the enable signal generator 132 for receiving the enable signal, is coupled to the storage unit 12, and is configured to determine, immediately after receipt of the enable signal, which one of the reference states the lighting state stored in the storage unit 12 is, to generate a control signal according to the lighting state (i.e., the one of the reference states), and to update the lighting state stored in the storage unit 12 according to the switch-on time period and the lighting state.

Figure 5:
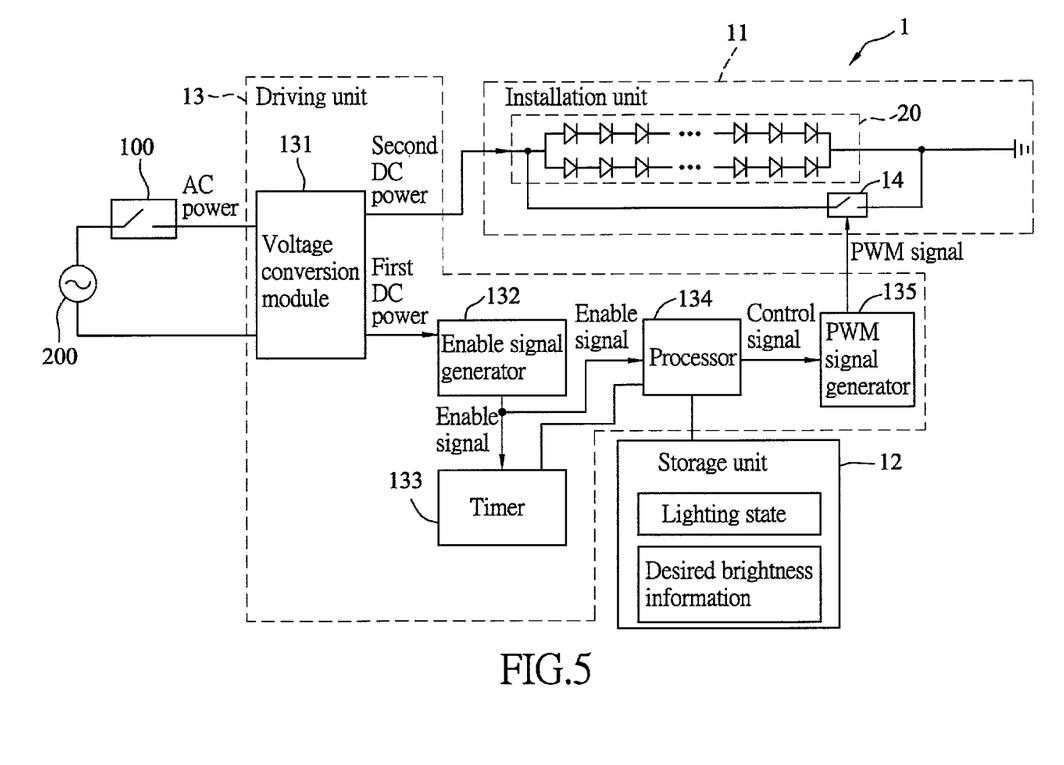
FIG. 5 is a circuit block diagram illustrating a variation of the first embodiment.

The PWM signal generator 135 is coupled to the processor 134 for receiving the control signal, is configured to generate a PWM signal according to the control signal, and is coupled to the control terminal of the dimming switch 14 for providing the PWM signal thereto. Accordingly, when the light switch 100 is switched to ON, the light emitting module 20 emits light, and average brightness thereof is determined by a duty ratio of the PWM signal, where a higher duty ratio of the PWM signal results in higher average brightness, and vice versa. In a variation of the first embodiment as shown in FIG. 5, the dimming switch 14 may be coupled to the light emitting module 20 in parallel. In practice, the dimming switch 14 may have a resistance lower than 100 ohms when conducting, causing a voltage across the light emitting module 20 to be lower than a forward threshold voltage thereof, so the light emitting module 20 emits light according to the second DC power when the dimming switch 14 does not conduct, and does not emit light when the dimming switch 14 conducts. In such a case, a lower duty ratio of the PWM signal results in higher average brightness, and vice versa. It is noted that the PWM signal may have a frequency such that the dimming of the light emitting module 20 is not perceivable for human eyes, and a continuous light emission period of the light emitting module 20 felt by a human may thus be substantially equal to the switch-on time period timed by the timer 133.

In a first application of this embodiment, when the processor 134 determines that the lighting state is one of the predetermined brightness states, the control signal generated by the processor 134 is associated with one of the predetermined brightness levels that corresponds to the predetermined brightness state, and the driving unit 13 drives the light emitting module 20 to stably emit light according to the predetermined brightness level when the driving unit 13 receives the AC power. Meanwhile, the processor 134 updates the lighting state to a next one of the reference states in the sequence following the lighting state (e.g., by adding one to the reference code corresponding to the lighting state) immediately after the lighting state is determined to be one of the predetermined brightness states, and updates, immediately after the switch-on time period reaches a first predetermined time period, the lighting state to a primary brightness state which is one of the predetermined brightness states. In this application, the primary brightness state is one of the predetermined brightness states that corresponds to a maximum brightness level among the brightness levels corresponding to the predetermined brightness states, which is for example a first one of the predetermined brightness states corresponding to the smallest reference code, but the disclosure is not limited thereto.

When the processor 134 determines that the lighting state is the brightness selecting state, the control signal generated by the processor 134 causes the driving unit 13 to drive the light emitting module 20 to cyclically emit light according to a plurality of brightness levels that are arranged in a predetermined sequence when the driving unit 13 receives the AC power. For example, the light emitting module 20 may emit light according to a brightness level that gradually reduces from a maximum brightness level to a minimum brightness level at a constant pace, and repeats the cycle, but this disclosure is not limited to such. It is noted that the maximum brightness level may either be the same as or different from the maximum one of the predetermined brightness levels, and the disclosure is not limited to such. Meanwhile, the processor 134 updates the lighting state to the selected brightness state immediately after the lighting state is determined to be the brightness selecting state, and stores in the storage unit 12 a brightness information associated with the latest brightness level of the light emitted by the light emitting module 20 as the desired brightness information before the receipt of the AC power stops (i.e., the light switch 100 being turned off).

When the processor 134 determines that the lighting state is the selected brightness state, the control signal generated by the processor 134 causes the driving unit 13 to drive the light emitting module 20 to stably emit light according to a brightness level associated with the desired brightness information when the driving unit 13 receives the AC power. Meanwhile, the processor 134 updates the lighting state to the brightness selecting state immediately after the lighting state is determined to be the selected brightness state, and updates the lighting state to the primary brightness state immediately after the switch-on time period reaches a second predetermined time period. The second predetermined time period may either be the same as or different from the first predetermined time period, and the disclosure is not limited to such.

Figure 2:
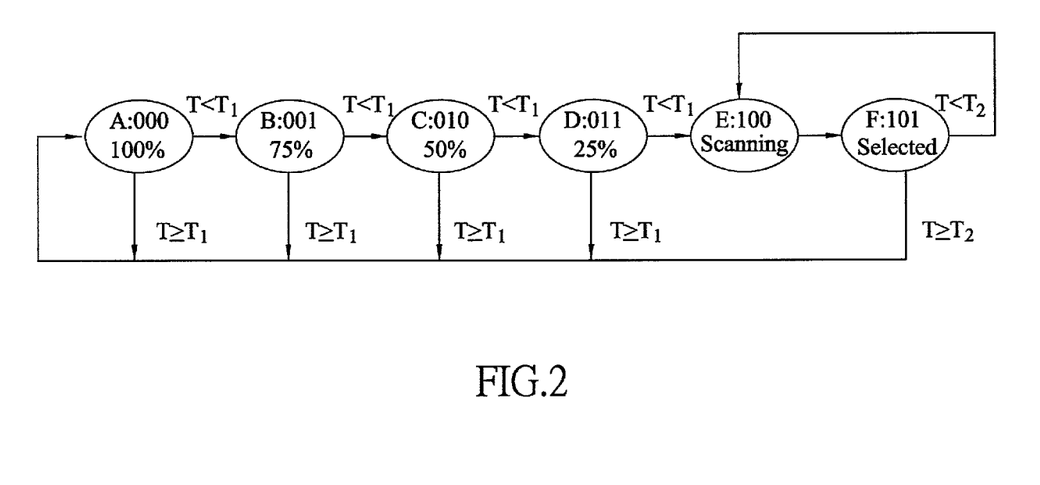
FIG. 2 is a schematic flow diagram illustrating an exemplary implementation of a first application of the first embodiment.

FIG. 2 and Table 1 show an exemplary implementation of the first application which includes six reference states represented by three bits (i.e., reference codes), which uses eight bits to represent 256 brightness levels, and of which each of the first predetermined time period (T1) and the second predetermined time period (T2) is five seconds. The reference states include four predetermined brightness states (A, B, C, D), the brightness selecting state (E) and the selected brightness state (F), where the predetermined brightness state (A) is the primary brightness state.

TABLE 1

| Reference state | Reference code | Brightness | Brightness level code | Next lighting state (T: switch-on time period) |
|---|---|---|---|---|
| A | 000 | 100% (Max) | 00000000 | B, when T < T1<br>A, when T ≥ T1 |
| B | 001 | 75% | 01000000 | C, when T < T1<br>A, when T ≥ T1 |
| C | 010 | 50% | 10000000 | D, when T < T1<br>A, when T ≥ T1 |
| D | 011 | 25% | 11000000 | E, when T < T1<br>A, when T ≥ T1 |
| E | 100 | Cyclically varying from max to min | Cyclically varying from 00000000 to 11111111 | F |
| F | 101 | Final brightness in "E" | Final brightness level in "E" | E, when T < T2<br>A, when T ≥ T2 |

In this exemplary implementation, the predetermined brightness states (A-D) respectively correspond to 100%, 75%, 50% and 25% of the maximum brightness of light emitted by the light emitting module 20 driven by the second DC power.

When the light fixture 1 is activated (i.e., the light switch 100 is switched to ON) with a lighting state code that corresponds to the lighting state being "000", the light emitting module 20 is driven to operate in state (A) and stably emits light with the maximum brightness (i.e., duty ratio of the PWM signal is 100%), the corresponding brightness level code "00000000" may be stored in the storage unit 12 as the desired brightness information, and the lighting state code is immediately updated to "001". If the light switch 100 is switched to OFF before the switch-on time period (T), which is substantially equal to the light emission period of the light emitting module 20, reaches the first predetermined time period (T1) (i.e., T<T1), the lighting state code remains to be "001" until the next time the light fixture 1 is activated, and the light fixture 1 would operate in state (B) during a next activation. When the switch-on time period (T) (i.e., the time the light switch 100 remains ON) reaches the first predetermined time period (T1), the lighting state code is immediately updated to "000". If the light switch 100 is switched to OFF after the switch-on time period (T) has reached the first predetermined time period (T1) (i.e., T≥T1), the lighting state code remains to be "000" until the next time the light fixture 1 is activated, and the light fixture 1 would still operate in state (A) during the next activation.

When the light fixture 1 is activated with the lighting state code being "001", the light emitting module 20 is driven to operate in state (B) and stably emits light with 75% of the maximum brightness (i.e., duty ratio of the PWM signal is 75%), the corresponding brightness level code "01000000" may be stored in the storage 12 as the desired brightness information, and the lighting state code is immediately updated to "010". If the light switch 100 is switched to OFF before the switch-on time period (T) reaches the first predetermined time period (T1) (i.e., T<T1), the lighting state code remains to be "010" until the next time the light fixture 1 is activated, and the light fixture 1 would operate in state (C) during the next activation. When the switch-on time period (T) reaches the first predetermined time period (T1), the lighting state code is immediately updated to "000". If the light switch 100 is switched to OFF after the switch-on time period (T) has reached the first predetermined time period (T1) (i.e., T≥T1), the lighting state code remains to be "000" until the next time the light fixture 1 is activated, and the light fixture 1 would operate in state (A) during the next activation.

When the light fixture 1 is activated with the lighting state code being "010", the light emitting module 20 is driven to operate in state (C) and stably emits light with 50% of the maximum brightness (i.e., duty ratio of the PWM signal is 50%), the corresponding brightness level code "10000000" may be stored in the storage 12 as the desired brightness information, and the lighting state code is immediately updated to "011". If the light switch 100 is switched to OFF before the switch-on time period (T) reaches the first predetermined time period (T1) (i.e., T<T1), the lighting state code remains to be "011" until the next time the light fixture 1 is activated, and the light fixture 1 would operate in state (D) during the next activation. When the switch-on time period (T) reaches the first predetermined time period (T1), the lighting state code is immediately updated to "000". If the light switch 100 is switched to OFF after the switch-on time period (T) has reached the first predetermined time period (T1) (i.e., T≥T1), the lighting state code remains to be "000" until the next time the light fixture 1 is activated, and the light fixture 1 would operate in state (A) during the next activation.

When the light fixture 1 is activated with the lighting state code being "011", the light emitting module 20 is driven to operate in state (D) and stably emits light with 25% of the maximum brightness (i.e., duty ratio of the PWM signal is 25%), the corresponding brightness level code "11000000" may be stored in the storage 12 as the desired brightness information, and the lighting state code is immediately updated to "100". If the light switch 100 is switched to OFF before the switch-on time period (T) reaches the first predetermined time period (T1) (i.e., T<T1), the lighting state code remains to be "100" until the next time the light fixture 1 is activated, and the light fixture 1 would operate in state (E) during the next activation. When the switch-on time period (T) reaches the first predetermined time period (T1), the lighting state code is immediately updated to "000". If the light switch 100 is switched to OFF after the switch-on time period (T) has reached the first predetermined time period (T1) (i.e., T≥T1), the lighting state code remains to be "000" until the next time the light fixture 1 is activated, and the light fixture 1 would operate in state (A) during the next activation.

When the light fixture 1 is activated with the lighting state code being "100", the lighting state code is immediately updated to "101", the light emitting module 20 is driven to operate in state (E) and cyclically emits light according to a brightness level that gradually reduces from, for example, the maximum to the minimum (i.e., the brightness level code gradually changes from "00000000" to "11111111") at a frequency of 1 Hz in a scanning manner, and the desired brightness information is continuously updated along with the brightness variation of the light emitting module 20. In other words, the desired brightness information continuously and cyclically changes from "00000000" to "11111111" until the light switch 100 is switched to OFF. In other implementations, the brightness level may gradually increase from minimum to maximum (i.e., the brightness level code gradually changes from "11111111" to "00000000"), or change between two intermediate brightness levels, at a desired frequency, and the disclosure is not limited to such. In this exemplary implementation, a smaller brightness level code corresponds to a higher brightness level, but this disclosure is not limited thereto. The lighting state code remains to be "101" until the next time the light fixture 1 is activated, and the light fixture 1 would operate in state (F) during the next activation.

When the light fixture 1 is activated with the lighting state code being "101", the light emitting module 20 is driven to operate in state (F) and stably emits light according to a brightness level corresponding to the desired brightness information (i.e., the final brightness level during the last activation in state (E)), and the lighting state code is immediately updated to "100". If the light switch 100 is switched to OFF before the switch-on time period (T) reaches the second predetermined time period (T1) (i.e., T<T2), the lighting state code remains to be "100" until the next time the light fixture 1 is activated, and the light fixture 1 would operate instate (E) during the next activation. When the switch-on time period (T) reaches the second predetermined time period (T2), the lighting state code is immediately updated to "000". If the light switch 100 is switched to OFF after the switch-on time period (T) has reached the second predetermined time period (T2) (i.e., T≥T2), the lighting state code remains to be "000" until the next time the light fixture 1 is activated, and the light fixture 1 would operate in state (A) during the next activation.

In a second application of this embodiment, when the processor 134 determines that the lighting state is one of the predetermined brightness states, the control signal generated by the processor 134 is associated with one of the predetermined brightness levels that corresponds to the predetermined brightness state, and the driving unit 13 drives the light emitting module 20 to stably emit light according to the predetermined brightness level when the driving unit 13 receives the AC power. Meanwhile, the processor 134 updates the lighting state to a next one of the reference states immediately after the lighting state is determined to be one of the predetermined brightness states, updates the lighting state to the primary brightness state immediately after the switch-on time period reaches a first predetermined time period, and updates the lighting state to the predetermined brightness state that is initially determined thereby to be the lighting state immediately after the switch-on time period reaches a second predetermined time period that is longer than the first predetermined time period. When the processor 134 determines that the lighting state is the brightness selecting state, the operation of the light fixture 1 is the same as that of the first application as described above, and details thereof are not repeated herein for the sake of brevity.

When the processor 134 determines that the lighting state is the selected brightness state, the control signal generated by the processor 134 causes the driving unit 13 to drive the light emitting module 20 to stably emit light according to a brightness level associated with the desired brightness information when the driving unit 13 receives the AC power. Meanwhile, the processor 134 updates the lighting state to the brightness selecting state immediately after the lighting state is determined to be the selected brightness state, updates the lighting state to the primary brightness state immediately after the switch-on time period reaches a third predetermined time period, and updates the lighting state to the selected brightness state immediately after the switch-on time period reaches a fourth predetermined time period that is longer than the third predetermined time period.

Figure 3:
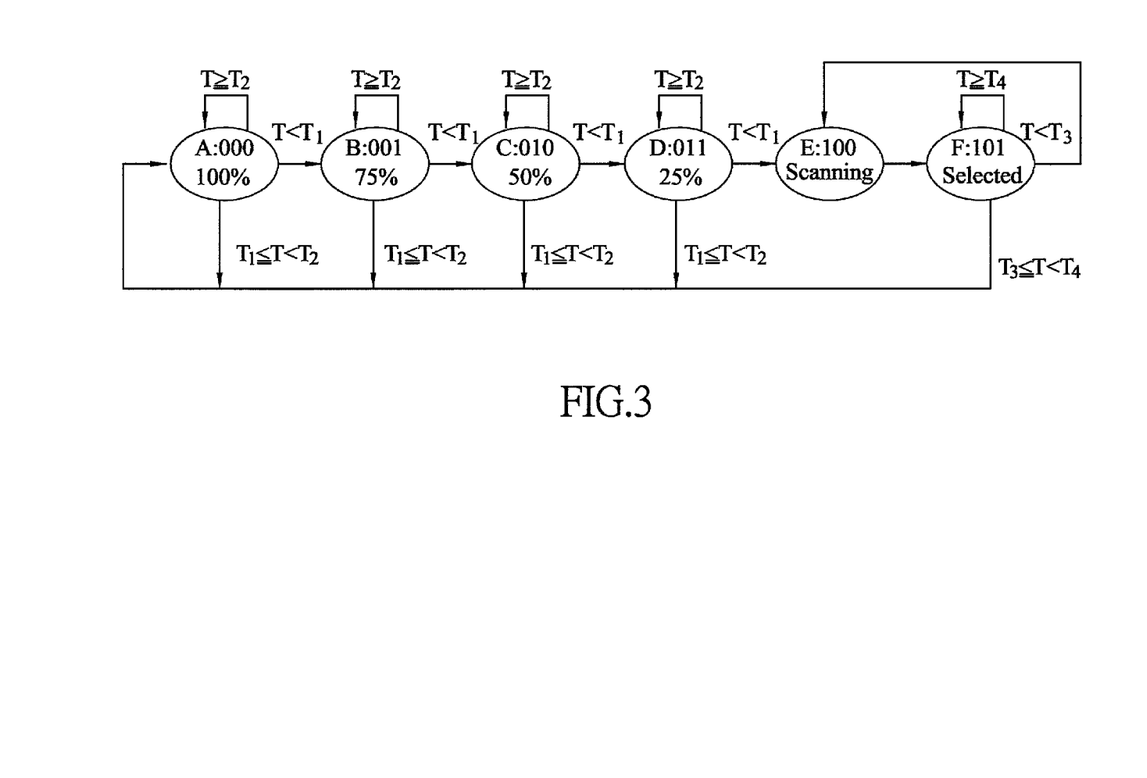
FIG. 3 is a schematic flow diagram illustrating an exemplary implementation of a second application of the first embodiment.

FIG. 3 and Table 2 show an exemplary implementation of the second application which includes six reference states represented by three bits (i.e., reference codes), which uses eight bits to represent 256 brightness levels, of which each of the first predetermined time period (T1) and the third predetermined time period (T3) is five seconds, and of which each of the second predetermined time period (T2) and the fourth predetermined time period (T4) is one minute. The reference states include four predetermined brightness states (A, B, C, D), the brightness selecting state (E) and the selected brightness state (F), where the predetermined brightness state (A) is the primary brightness state.

TABLE 2

| Reference state | Reference code | Brightness | Brightness level code | Next lighting state (T: switch-on time period) |
|---|---|---|---|---|
| A | 000 | 100% (Max) | 00000000 | B, when T < T1<br>A, when T1 ≤ T < T2<br>A, when T ≥ T2 |
| B | 001 | 75% | 01000000 | C, when T < T1<br>A, when T1 ≤ T < T2<br>B, when T ≥ T2 |
| C | 010 | 50% | 10000000 | D, when T < T1<br>A, when T1 ≤ T < T2<br>C, when T ≥ T2 |
| D | 011 | 25% | 11000000 | E, when T < T1<br>A, when T1 ≤ T < T2<br>D, when T ≥ T2 |
| E | 100 | Cyclically varying from max to min | Cyclically varying from 00000000 to 11111111 | F |
| F | 101 | Final brightness in "E" | Final brightness level in "E" | E, when T < T3<br>A, when T3 ≤ T < T4<br>F, when T ≥ T4 |

When the light fixture 1 is activated with the lighting state code being "000", the light emitting module 20 is driven to operate in state (A) and stably emits light with the maximum brightness, the corresponding brightness level code "00000000" may be stored in the storage unit 12 as the desired brightness information, and the lighting state code is immediately updated to "001". If the light switch 100 is switched to OFF before the switch-on time period (T) reaches the first predetermined time period (T1) (i.e., T<T1), the lighting state code remains to be "001" until the next time the light fixture 1 is activated, and the light fixture 1 would operate in state (B) during the next activation. When the switch-on time period (T) reaches the first predetermined time period (T1), the lighting state code is immediately updated to "000". If the light switch 100 is switched to OFF at the time the switch-on time period (T) reaches the first predetermined time period (T1) or thereafter (regardless of how long thereafter, i.e., the switch on time period (T) may reach the second predetermined time period (T2) or not) (i.e., T1≤T<T2 or T≥T2), the lighting state code remains to be "000" until the next time the light fixture 1 is activated, and the light fixture 1 would still operate in state (A) during the next activation.

When the light fixture 1 is activated with the lighting state code being "001", the light emitting module 20 is driven to operate in state (B) and stably emits light with 75% of the maximum brightness, the corresponding brightness level code "01000000" may be stored in the storage unit 12 as the desired brightness information, and the lighting state code is immediately updated to "010". If the light switch 100 is switched to OFF before the switch-on time period (T) reaches the first predetermined time period (T1) (i.e., T<T1), the lighting state code remains to be "010" until the next time the light fixture 1 is activated, and the light fixture 1 would operate in state (C) during the next activation. When the switch-on time period (T) reaches the first predetermined time period (T1), the lighting state code is immediately updated to "000". If the light switch 100 is switched to OFF when the switch-on time period (T) is between the first predetermined time period (T1) and the second predetermined time period (T2) (i.e., T1≤T<T2), the lighting state code remains to be "000" until the next time the light fixture 1 is activated, and the light fixture 1 would operate in state (A) during the next activation. When the switch-on time period (T) reaches the second predetermined time period (T2), the lighting state code is immediately updated to "001". If the light switch 100 is switched to OFF when the switch-on time period (T) reaches the second predetermined time period (T2) or thereafter (i.e., T≥T2), the lighting state code remains to be "001" until the next time the light fixture 1 is activated, and the light fixture 1 would operate in state (B) during the next activation.

When the light fixture 1 is activated with the lighting state code being "010", the light emitting module 20 is driven to operate in state (C) and stably emits light with 50% of the maximum brightness, the corresponding brightness level code "10000000" may be stored in the storage unit 12 as the desired brightness information, and the lighting state code is immediately updated to "011". If the light switch 100 is switched to OFF before the switch-on time period (T) reaches the first predetermined time period (T1) (i.e., T<T1), the lighting state code remains to be "011" until the next time the light fixture 1 is activated, and the light fixture 1 would operate in state (D) during the next activation. When the switch-on time period (T) reaches the first predetermined time period (T1), the lighting state code is immediately updated to "000". If the light switch 100 is switched to OFF when the switch-on time period (T) is between the first predetermined time period (T1) and the second predetermined time period (T2) (i.e., T1≤T<T2), the lighting state code remains to be "000" until the next time the light fixture 1 is activated, and the light fixture 1 would operate in state (A) during the next activation. When the switch-on time period (T) reaches the second predetermined time period (T2), the lighting state code is immediately updated to "010". If the light switch 100 is switched to OFF when the switch-on time period (T) reaches the second predetermined time period (T2) or thereafter (i.e., T≥T2), the lighting state code remains to be "010" until the next time the light fixture 1 is activated, and the light fixture 1 would operate in state (C) during the next activation.

When the light fixture 1 is activated with the lighting state code being "011", the light emitting module 20 is driven to operate in state (D) and stably emits light with 25% of the maximum brightness, the corresponding brightness level code "11000000" may be stored in the storage unit 12 as the desired brightness information, and the lighting state code is immediately updated to "100". If the light switch 100 is switched to OFF before the switch-on time period (T) reaches the first predetermined time period (T1) (i.e., T<T1), the lighting state code remains to be "100" until the next time the light fixture 1 is activated, and the light fixture 1 would operate in state (E) during the next activation. When the switch-on time period (T) reaches the first predetermined time period (T1), the lighting state code is immediately updated to "000". If the light switch 100 is switched to OFF when the switch-on time period (T) is between the first predetermined time period (T1) and the second predetermined time period (T2) (i.e., T1≤T<T2), the lighting state code remains to be "000" until the next time the light fixture 1 is activated, and the light fixture 1 would operate instate (A) during the next activation. When the switch-on time period (T) reaches the second predetermined time period (T2), the lighting state code is immediately updated to "011". If the light switch 100 is switched to OFF when the switch-on time period (T) reaches the second predetermined time period (T2) or thereafter (i.e., T≥T2), the lighting state code remains to be "011" until the next time the light fixture 1 is activated, and the light fixture 1 would operate in state (D) during the next activation.

When the light fixture 1 is activated with the lighting state code being "100", the operation of the light fixture 1 is the same as that described in the exemplary implementation of the first application, and details thereof are not repeated herein for the sake of brevity.

When the light fixture 1 is activated with the lighting state code being "101", the light emitting module 20 is driven to operate in state (F) and stably emits light according to a brightness level corresponding to the desired brightness information (i.e., the final brightness level during the last activation in state (E)), and the lighting state code is immediately updated to "100". If the light switch 100 is switched to OFF before the switch-on time period (T) reaches the third predetermined time period (T3) (i.e., T<T3), the lighting state code remains to be "100" until the next time the light fixture 1 is activated, and the light fixture 1 would operate in state (E) during the next activation. If the light switch 100 is switched to OFF when the switch-on time period (T) is between the third predetermined time period (T3) and the fourth predetermined time period (T4) (i.e., T3≤T<T4), the lighting state code remains to be "000" until the next time the light fixture 1 is activated, and the light fixture 1 would operate in state (A) during the next activation. When the switch-on time period (T) reaches the fourth predetermined time period (T4), the lighting state code is immediately updated to "101". If the light switch 100 is switched to OFF when the switch-on time period (T) reaches the fourth predetermined time period (T4) or thereafter (i.e., T≥T4), the lighting state code remains to be "101" until the next time the light fixture 1 is activated, and the light fixture 1 would operate in state (F) during the next activation.

Figure 4:
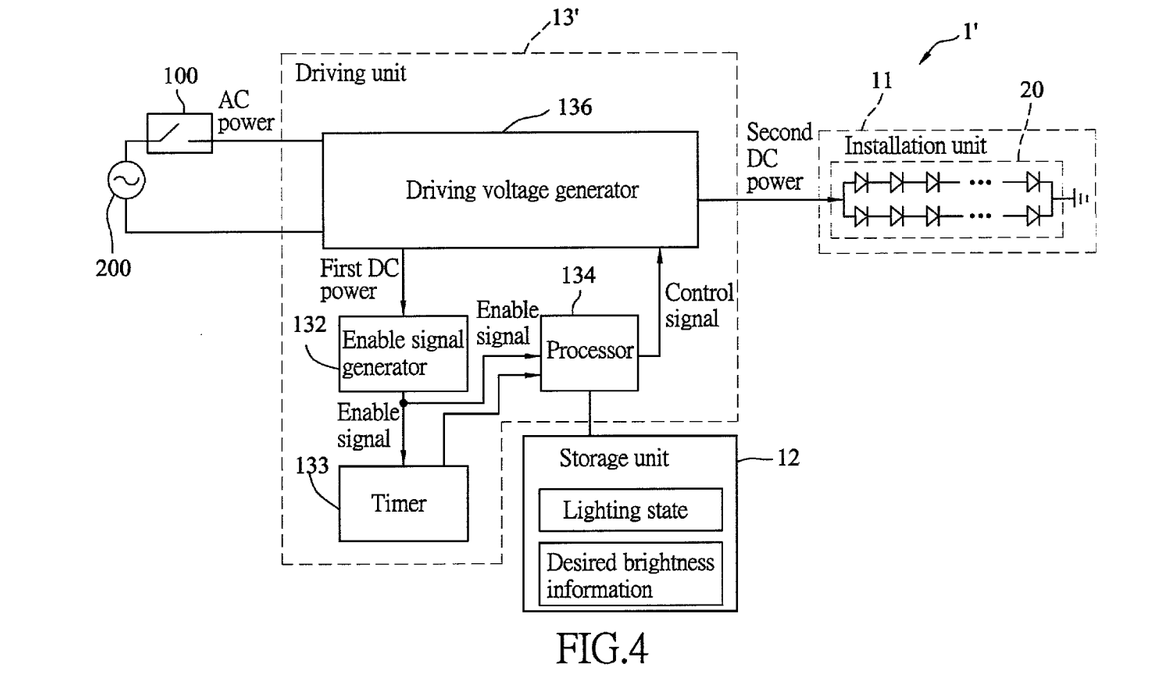
FIG. 4 is a circuit block diagram illustrating a second embodiment of the light fixture according to the disclosure.

Referring to FIG. 4, the second embodiment of the light fixture 1' according to this disclosure is shown to be similar to the first embodiment, and differs in that a driving unit 13' of the second embodiment includes a driving voltage generator 136 instead of the voltage conversion module 131 and the PWM signal generator 135 (see FIG. 1), and that the dimming switch 14 (see FIG. 1) is omitted.

The driving voltage generator 136 converts the AC power that is received via the light switch 100 into the first DC power, converts the AC power into the second DC power according to the control signal received from the processor 134, and provides the second DC power to the light emitting module 20 such that the light emitting module 20 emits light with brightness associated with a current magnitude resulting from the second DC power. In this embodiment, the second DC power does not have a constant voltage, and has a voltage magnitude that may vary between, for example, 0V and 10V based on the control signal. In other words, the second embodiment controls the brightness of light emitted by the light emitting module 20 by adjusting the voltage magnitude or the current magnitude of the second DC power, instead of the duty ratio of the PWM signal as in the first embodiment. Accordingly, the abovementioned first and second applications are also applicable to the second embodiment.

In summary, by use of the light fixture 1, 1', users may control brightness of light emitted by the light emitting module 20 by repeatedly switching ON/OFF of the light switch 100, thereby achieving desired brightness. Brightness adjustment of the light emitting module 20 may be easily achieved by cooperation of the light switch 100 and the light fixture 1, 1' according to this disclosure, and additional dimmers or devices for remote control are not required. The first and second embodiments are thus suitable for existing buildings.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light fixture coupled to an alternating current (AC) power source via a light switch, the light switch permitting provision of AC power by the AC power source to said light fixture when conducting, and stopping provision of the AC power to said light fixture when not conducting, said light fixture comprising:
    a storage unit configured to store therein a lighting state of said light fixture, the lighting state being one of a plurality of reference states that include a brightness selecting state and a selected brightness state; and
    a driving unit to be coupled to the light switch for receiving the AC power when the light switch conducts, to be coupled to a light emitting module, and determining, immediately after receipt of the AC power, which one of the reference states the lighting state is;
    wherein said driving unit drives the light emitting module to cyclically emit light according to a plurality of brightness levels that are arranged in a predetermined sequence when said driving unit receives the AC power and determines that the lighting state is the brightness selecting state; and
    wherein said driving unit drives the light emitting module to stably emit light according to one of the brightness levels when said driving unit receives the AC power and determines that the lighting state is the selected brightness state.

2. The light fixture of claim 1, wherein, when the lighting state is determined to be the brightness selecting state, said driving unit updates the lighting state to the selected brightness state immediately after determining the lighting state to be the brightness selecting state, and stores in said storage unit a brightness information that is associated with a final one of the brightness levels of light emitted by the light emitting module before the receipt of the AC power stops and that serves as a desired brightness information.

3. The light fixture of claim 2, wherein said driving unit drives the light emitting module to stably emit light according to a brightness level associated with the desired brightness information when said driving unit receives the AC power and determines that the lighting state is the selected brightness state.

4. The light fixture of claim 2, wherein the reference states further include a predetermined brightness state corresponding to a predetermined brightness level; and
    wherein said driving unit drives the light emitting module to stably emit light according to the predetermined brightness level when said driving unit receives the AC power and determines that the lighting state is the predetermined brightness state.

5. The light fixture of claim 4, wherein said driving unit updates the lighting state according to a switch-on time period that corresponds to a time period during which said driving unit continuously receives the AC power when said driving unit determines that the lighting state is one of the reference states other than the brightness selecting state.

6. The light fixture of claim 4, wherein the reference states include a plurality of the predetermined brightness states which respectively correspond to different brightness levels, the predetermined brightness states, the brightness selecting state and the selected brightness state are arranged in a sequence in the given order, and one of the predetermined brightness states serves as a primary brightness state;
    wherein when said driving unit determines that the lighting state is one of the predetermined brightness states, said driving unit, immediately after determining the lighting state to be one of the predetermined brightness states, updates the lighting state to a next one of the reference states in the sequence following the one of the predetermined brightness states, and updates the lighting state to the primary brightness state immediately after a switch-on time period that corresponds to a time period during which said driving unit continuously receives the AC power reaches a first predetermined time period; and
    wherein when said driving unit determines that the lighting state is the selected brightness state, said driving unit drives the light emitting module to stably emit light according to a brightness level associated with the desired brightness information when receiving the AC power, updates the lighting state to the brightness selecting state immediately after determining the lighting state to be the selected brightness state, and updates the lighting state to the primary brightness state immediately after the switch-on time period reaches a second predetermined time period.

7. The light fixture of claim 6, wherein the second predetermined time period is equal to the first predetermined time period.

8. The light fixture of claim 6, wherein a first one of the predetermined brightness states in the sequence corresponds to a maximum brightness level among the brightness levels corresponding to the predetermined brightness states.

9. The light fixture of claim 8, wherein the primary brightness state is the first one of the predetermined brightness states.

10. The light fixture of claim 4, wherein the reference states include a plurality of the predetermined brightness states which respectively correspond to different brightness levels, the predetermined brightness states, the brightness selecting state and the selected brightness state are arranged in a sequence in the given order, and one of the predetermined brightness states serves as a primary brightness state;

wherein when said driving unit determines that the lighting state is one of the predetermined brightness states, said driving unit updates, according to a switch-on time period that corresponds to a time period during which said driving unit continuously receives the AC power, the lighting state to one of said one of the predetermined brightness states, a next one of the reference states in the sequence, and the primary brightness state; and wherein when said driving unit determines that the lighting state is the selected brightness state, said driving unit drives the light emitting module to stably emit light according to one of the brightness levels that is stored in said storage unit when receiving the AC power, and updates, according to the switch-on time period, the lighting state to one of the selected brightness state, the brightness selecting state, and the primary brightness state.

11. The light fixture of claim 10, wherein a first one of the predetermined brightness states in the sequence corresponds to a maximum brightness level among the brightness levels corresponding to the predetermined brightness states.

12. The light fixture of claim 11, wherein the primary brightness state is the first one of the predetermined brightness states.

13. The light fixture of claim 4, wherein the reference states include a plurality of the predetermined brightness states which respectively correspond to different brightness levels, the predetermined brightness states, the brightness selecting state and the selected brightness state are arranged in a sequence in the given order, and one of the predetermined brightness states serves as a primary brightness state;

wherein when said driving unit determines that the lighting state is one of the predetermined brightness states, said driving unit, immediately after determining the lighting state to be one of the predetermined brightness states, updates the lighting state to a next one of the reference states in the sequence following the one of the predetermined brightness states, updates the lighting state to the primary brightness state immediately after a switch-on time period that corresponds to a time period during which said driving unit continuously receives the AC power reaches a first predetermined time period, and updates the lighting state to said one of the predetermined brightness states immediately after the switch-on time period reaches a second predetermined time period which is longer than the first predetermined time period; and wherein when said driving unit determines that the lighting state is the selected brightness state, said driving unit drives the light emitting module to stably emit light according to one of the brightness levels that is stored in said storage unit when receiving the AC power, updates the lighting state to the brightness selecting state immediately after determining the lighting state to be the selected brightness state, updates the lighting state to the primary brightness state immediately after the switch-on time period reaches a third predetermined time period, and updates the lighting state to the selected brightness state immediately after the switch-on time period reaches a fourth predetermined time period that is longer than the third predetermined time period.

14. The light fixture of claim 1, further comprising:
a dimming switch to be coupled to the light emitting module, having a control terminal, and configured to conduct or not conduct according to a signal provided to said control terminal thereof;

wherein said driving unit includes:
a voltage conversion module to be coupled to the light switch for receiving the AC power when the light switch conducts, configured to convert the AC power into a first direct current (DC) power and a second DC power, and to be coupled to the light emitting module for providing the second DC power thereto;

an enable signal generator coupled to said voltage conversion module for receiving the first DC power, and configured to generate an enable signal upon receipt of the first AC power;

a processor coupled to said enable signal generator for receiving the enable signal, coupled to said storage unit, and configured to determine which one of the reference states the lighting state stored in said storage unit is immediately after receipt of the enable signal, and to generate a control signal according to the one of the reference states; and a pulse width modulation (PWM) signal generator coupled to said processor for receiving the control signal, configured to generate a PWM signal according to the control signal, and coupled to said control terminal of said dimming switch for providing the PWM signal thereto;

wherein said dimming switch, said voltage conversion module and the light emitting module are coupled in a way that the light emitting module emits light according to the second DC power and a state of said dimming switch.

15. The light fixture of claim 14, wherein said dimming switch is coupled to the light emitting module in series, such that the light emitting module emits light according to the second DC power when said dimming switch conducts, and that the light emitting module does not emit light when said dimming switch does not conduct.

16. The light fixture of claim 14, wherein said dimming switch is coupled to the light emitting module in parallel, such that the light emitting module emits light according to the second DC power when said dimming switch does not conduct, and that the light emitting module does not emit light when said dimming switch conducts.

17. The light fixture of claim 14, wherein the reference states further include a predetermined brightness state corresponding to a predetermined brightness level;

wherein said driving unit drives the light emitting module to stably emit light according to the predetermined brightness level when said driving unit receives the AC power and determines that the lighting state is the predetermined brightness state;

wherein said driving unit further includes a timer coupled to said enable signal generator for receiving the enable signal, coupled to said processor, and configured to start timing a switch-on time period immediately after receipt of the enable signal; and wherein said processor is further configured to update the lighting state stored in said storage unit according to the switch-on time period when the lighting state is determined thereby to be one of the reference states other than the brightness selecting state.

18. The light fixture of claim 1, wherein said driving unit includes:
a driving voltage generator to be coupled to the light switch for receiving the AC power when the light switch conducts, configured to convert the AC power into a first direct current (DC) power, and to convert the AC power into a second DC power according to a control signal, and to be coupled to the light emitting module for providing the second DC power thereto such that the light emitting module emits light with brightness associated with a current magnitude resulting from the second DC power;

an enable signal generator coupled to said driving voltage generator for receiving the first DC power, and configured to generate an enable signal upon receipt of the first AC power; and a processor coupled to said enable signal generator for receiving the enable signal, coupled to said storage unit, and configured to determine which one of the reference states the lighting state stored in said storage unit is immediately after receipt of the enable signal, and to generate and provide the control signal to said driving voltage generator according to the one of the reference states.

19. The light fixture of claim 18, wherein the reference states further include a predetermined brightness state corresponding to a predetermined brightness level;

wherein said driving unit drives the light emitting module to stably emit light according to the predetermined brightness level when said driving unit receives the AC power and determines that the lighting state is the predetermined brightness state;

wherein said driving unit further includes a timer coupled to said enable signal generator for receiving the enable signal, coupled to said processor, and configured to start timing a switch-on time period immediately after receipt of the enable signal; and wherein said processor is further configured to update the lighting state stored in said storage unit according to the switch-on time period when the lighting state is determined thereby to be one of the reference states other than the brightness selecting state.

20. The light fixture of claim 14, further comprising the light emitting module.

\* \* \* \* \*